May 5, 1959     E. ROFFMAN ET AL     2,885,075
ELECTRONIC SCLEROMETER
Filed May 21, 1952     3 Sheets-Sheet 1
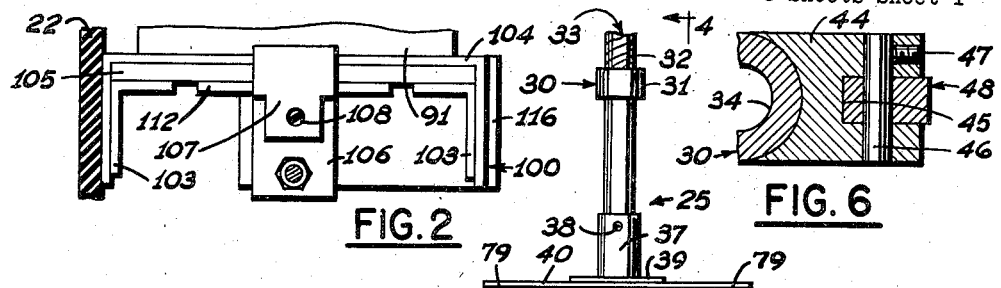
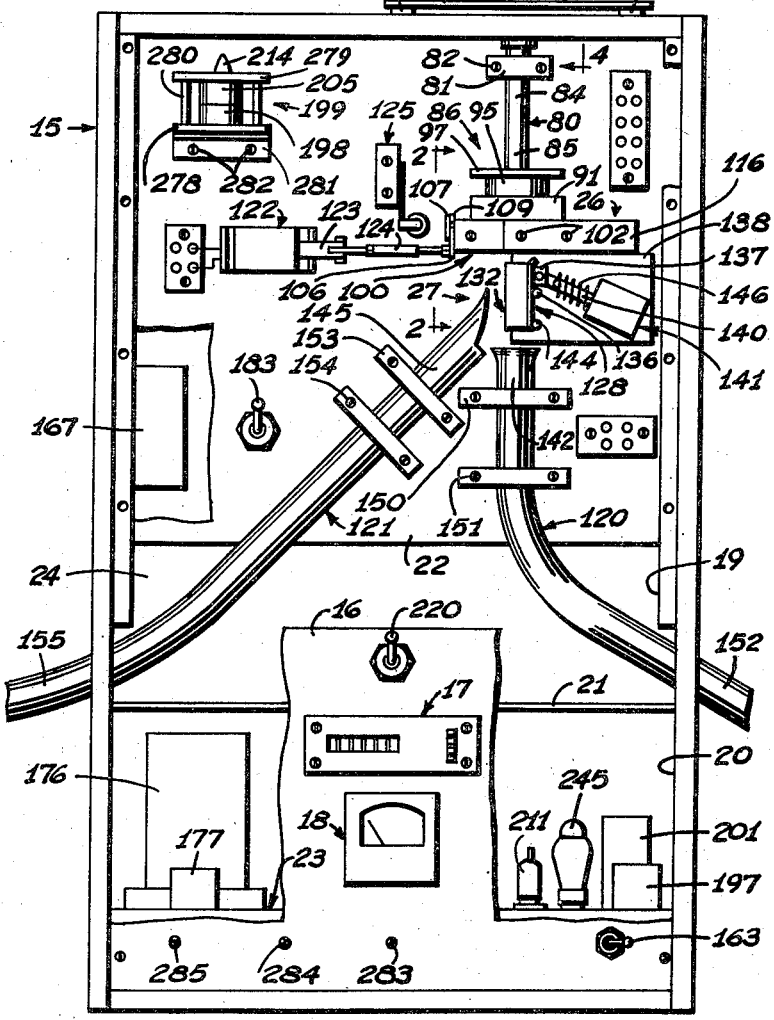
FIG. 1
INVENTOR.
EUGENE ROFFMAN
DOMINIC CINAGLIA
ALFRED WYSOCZANSKI
ARTHUR BRAND III
ATTORNEYS May 5, 1959

E. ROFFMAN ET AL 2,885,075

ELECTRONIC SCLEROMETER

Filed May 21, 1952

INVENTOR.
EUGENE ROFFMAN
DOMINIC CINAGLIA
ALFRED WYSOCZANSKI
ARTHUR BRAND III

BY G. J. Kessenich, A. W. Dew + H. J. Forman
ATTORNEYS.

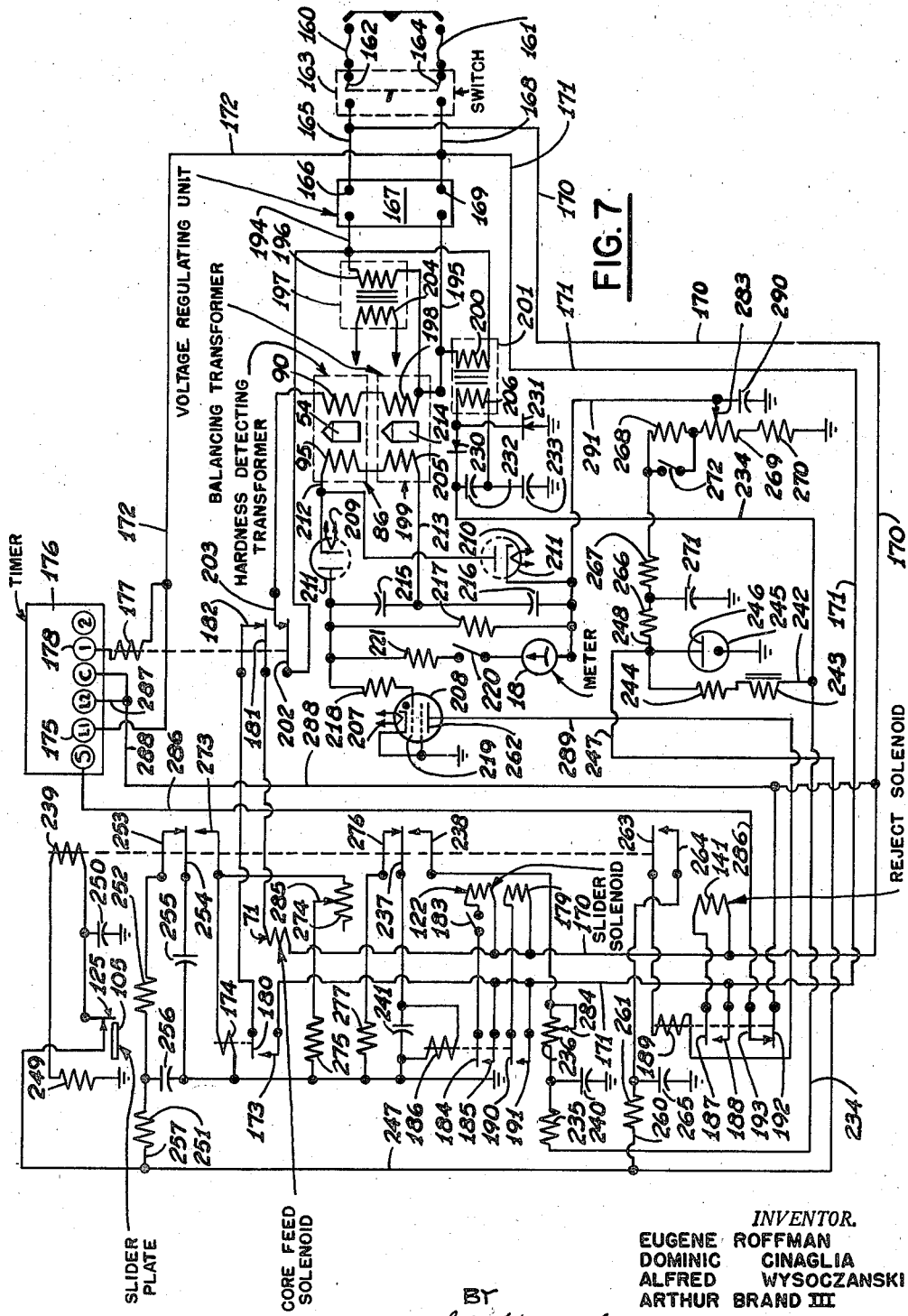

United States Patent Office 2,885,075
Patented May 5, 1959

2,885,075
ELECTRONIC SCLEROMETER

Eugene Roffman, Philadelphia, Dominic Cinaglia, Norristown, and Alfred Wysoczanski and Arthur Brand III, Philadelphia, Pa., assignors to the United States of America as represented by the Secretary of the Army Application May 21, 1952, Serial No. 289,184

8 Claims. (Cl. 209—72)

(Granted under Title 35, U.S. Code (1952), sec. 266)

The invention described herein may be manufactured and used by or for the Government for governmental purposes without the payment to us of any royalty thereon.

Our invention pertains broadly to sclerometers (i.e., instruments for indicating the relative hardness of materials). In particular, it has reference to a sclerometer which indicates the hardness of magnetic materials and which subsequently segregates the material found to have a hardness within acceptable limits from that found to have hardness outside those limits.

In these days of mass production and precision manufacturing, it is necessary to have sclerometers in the mills and factories where they can be used to check the hardness of enormous quantities of components comprising a production run. This need, which heretofore was not necessary, made it desirable to move sclerometers from the metallurgical laboratories where they were used only occasionally to check small quantities of material, into the various manufactories where they were used incessantly to check large quantities of material. Needless to say, these devices were neither designed for nor capable of use in highly competitive manufacturing processes and, therefore, were found to be unsuited for the purpose.

In the use of sclerometers, whose function depends purely upon a mechanical process, it was found that a great quantity of time was needed to determine the hardness of just one specimen. In addition, mechanical sclerometers, as is well known, determine the hardness at only a certain spot at a time. This is objectionable because there usually is an unavoidable variation in hardness from spot to spot on a specimen. In some spots, too, the hardness may be found to be below the accepted minimum tolerance level, and in other spots, the hardness may be found to be above that level.

In checking the hardness of workpieces comprising a production run by the use of mechanical sclerometers, it is usual practice to select comparatively few pieces from the lot to be used as specimens in the sclerometer. A series of test readings are then taken and are later averaged out to give the mean hardness of each specimen based on the number of readings made. Naturally, the greater the number of readings taken on each specimen, the more true will be the mean hardness determination. However, because of the time required to make each test reading, a very minimum number of readings is made so that the mean hardness determined would not necessarily be the mean hardness of the entire specimen. Depending upon the mean hardnesses of the specimens selected for testing, the mean hardness of each other workpiece comprising the production run is judged. This obviously, is a very haphazard procedure. It can easily be seen that the use of such a time-consuming hit-or-miss process where large quantities of pieces are involved would be prohibitive.

In distinction to this process, our sclerometer operates automatically to indicate, practically instantaneously, the mean hardness of an infinite number of separate hardness tests conducted simultaneously on each specimen, thereby giving the "overall" hardness of the specimen (i.e., hardness of the specimen's entire mass) and making it possible to check the hardness of each workpiece comprising a production run. Mechanical sclerometers also have the disadvantage that their use results in the evaluation of the specimen's surface hardness without any regard as to its "overall" hardness. In addition, for some tests with prior art mechanical sclerometers, it is necessary to section the specimen, or to otherwise render it unfit for further use. Further, the use of these sclerometers leaves the specimen tested with an indentation at every spot where a hardness reading was taken. This marring of the surface of the specimen is very undesirable since, in subsequent manufacturing processes or actual use of the specimen, the indentation could be the source of serious inadequacy.

Electrically operated sclerometers are known, but heretofore they have been found to be sorely inadequate and not adaptable to mass production determinations of hardness. To begin with, these instruments were composed of very expensive components and therefore required more careful treatment than they could receive in the shops. Another point of disadvantage was that certain manual adjustments of the sclerometers had to be made from piece to piece during the tests. By comparison, our sclerometer is entirely automatic, relatively foolproof and inexpensive to manufacture and operate.

Both types of prior art sclerometers, also required the attention of an operator to feed the material to be tested to the device, to read the hardness indicated during the test, then to unload the machine, and to segregate the material found to have an acceptable hardness from that found to have an unacceptable hardness.

With our sclerometer, we have obviated all the inadequacies and disadvantages of prior art sclerometers and have introduced to the art inventive concepts not heretofore known.

Our sclerometer will be described as being adapted to indicate whether or not bullet cores, in manufacture, have been hardened to an acceptable degree, and to segregate those of acceptable hardness from those of unacceptable hardness. It is not to be construed, however, that our invention is limited in application to the one chosen for illustrative purposes. As the description proceeds, it will, doubtless, become apparent that many other adaptations of our sclerometer are feasible without departing from the inventive concepts here disclosed.

In essence, our sclerometer is housed in an easily movable cabinet and is provided with an automatic electromechanical feed mechanism which allows the bullet cores to drop, one at a time, into the center of two adjacent coils which constitute the primary and secondary inductors of a hardness detecting transformer. The output of this transformer, which is dependent upon the hardness (permeability) of the bullet core which is to be checked, other things being equal, is matched against the output of a similarly constructed balancing transformer in whose center is a soft, unhardened bullet core of the same material, shape, and dimensions whose secondary is series-connected 180° out of phase with the hardness detecting transformer's secondary. The difference in the outputs of these two transformers is rectified and doubled then combined with a bias supplied from an auxiliary source, and the resultant voltage is applied to the control grid of a thyratron tube.

In the operation of our sclerometer, when a bullet core of acceptable hardness is in the hardness detecting transformer, the thyratron tube is biased beyond its cutoff point and therefore does not conduct any current. As a result, after the bullet core is automatically released from the detecting transformer, it is conducted from the sclerometer into a receptacle for bullet cores of acceptable hardness. When a bullet core of unacceptable hardness is in the hardness detecting transformer, the bias on the thyratron is reduced so that the tube becomes conductive. This action by the thyratron energizes a reject mechanism which operates to direct the unacceptable bullet core from the sclerometer and into another receptacle for bullet cores of unacceptable hardness after the core is released from the hardness detecting transformer.

To insure continued accuracy of our sclerometer, its operation is automatically stopped periodically at preselected intervals of time, and a critical portion of the device's electrical circuitry, together with the mechanical components associated therewith, is automatically checked for correct functioning. If those parts are found to be properly operable, the sclerometer's operation is automatically resumed; however, if those parts are found to be defective, the sclerometer's operation will remain suspended until the trouble is rectified by appropriate servicing.

Our sclerometer, further, is provided with various adjustments by which we can selectively adjust the rate of operation of our device to suit the particular workpieces whose hardness is to be checked. These adjustments make it possible selectively to set the hardness level of the sclerometer (i.e., the point on the hardness scale at or below which workpieces are of unacceptable hardness, and above which workpieces are of acceptable hardness), and by which we can adapt our sclerometer so as to be usable over the whole range of the hardness scale.

From the above epitomized description of our sclerometer, it can be seen that we have provided a device which is fast, accurate, fully automatic in operation, and which, after initial setup, does not require the constant attention of an attendant. Besides all these advantages, our sclerometer is composed of comparatively inexpensive components, and can be used without requiring any special precautions in connection with surrounding metallic or magnetic objects. All in all, our sclerometer possesses all the qualities which are demanded of a high-quantity production instrument including the strength to endure the treatment likely to be encountered.

One object of our invention is to provide an automatic, quick-acting sclerometer whose action depends upon the difference in output between two transformers whose primaries are connected in series-aiding relationship, and whose secondaries are connected in series-opposed relationship.

Another object is to provide a sclerometer which automatically will segregate material of unacceptable hardness from that having acceptable hardness.

Still another object is to provide a sclerometer capable of great sensitivity.

Yet another object is to provide a sclerometer capable of adjustment so as to be operable over the range of the hardness scale.

A further object is to provide a sclerometer which, in a single reading, will indicate the overall or approximate average hardness of material in distinction to sclerometers which indicate hardness at only one spot at a time.

A still further object is to provide a sclerometer in which the surface of the material tested is not marred or dented by the sclerometer's action.

Yet another object is to provide a sclerometer whose accuracy is automatically checked at preselected intervals of time during its operation.

The foregoing and other objects of our invention will become apparent from an inspection of the following description and the accompanying drawings, wherein:

Fig. 1 is a front view of our sclerometer showing, essentially, the relative positioning of various major components thereof. For convenience of drawing, a front door has been removed from the cabinet and the front panel below the door has been broken away to expose certain of the electronic components of the sclerometer.

Fig. 2 is a side view taken along line 2—2 of Fig. 1 and showing details of the sclerometer's slider mechanism.

Fig. 6 is a horizontal section taken along line 6—6 of Fig. 4 and showing more details of the sclerometer's feed mechanism.

Fig. 7 is a schematic diagram of the sclerometer's electrical circuitry.

Figure 3:
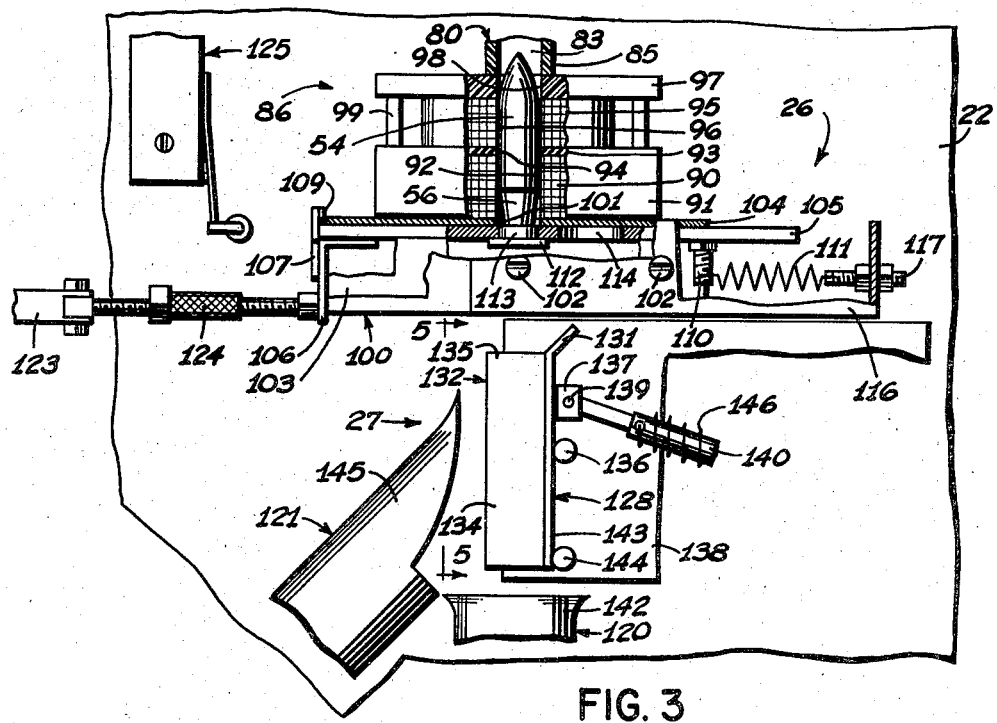
Fig. 3 is an enlargement of a corresponding portion of Fig. 1. To facilitate an understanding of the construction of this portion of the sclerometer, some portions have been broken away and some have been shown in section.

It will become more apparent, as the description proceeds, that our electronic sclerometer is an electro-mechanical mechanism. As evident in Fig. 1, the device, for the most part, is housed in a cabinet 15. In order to present a somewhat comprehensive showing of our device, a front panel 16 has been broken away, and another panel, ordinarily situated above panel 16 to cover the remainder of the front of the cabinet, has been entirely removed.

As shown in Fig. 1, front panel 16 contains certain electrical switches and adjustments in addition to an electrically-operated counter 17 and an electric meter 18. All these parts will be dealt with in more detail later.

The interior of cabinet 15 is divided into an upper compartment 19 and a lower compartment 20 by means of a partition 21. Supported in any convenient manner within the upper compartment is a panel 22 upon which many of our device's mechanical components, and some of its electrical components, both to be described later, are mounted. Accommodated in the cabinet's lower compartment is a chassis 23 upon which most of our device's electrical components, later to be introduced, are installed. For convenience of access to the interior compartments, cabinet 15 is also provided with a rear door 24 (see Fig. 1).

For convenience of description, and ease of understanding, it will be advantageous to consider our device first from the mechanical aspect, and then from the electrical aspect. After the presentation of the components there involved, the setting-up and operation of our device will be discussed.

MECHANICAL ASPECTS

The mechanical aspect of our electronic sclerometer includes a feed mechanism 25, a slider mechanism 26, and an accept-reject mechanism 27.

Feed mechanism

Figure 4:
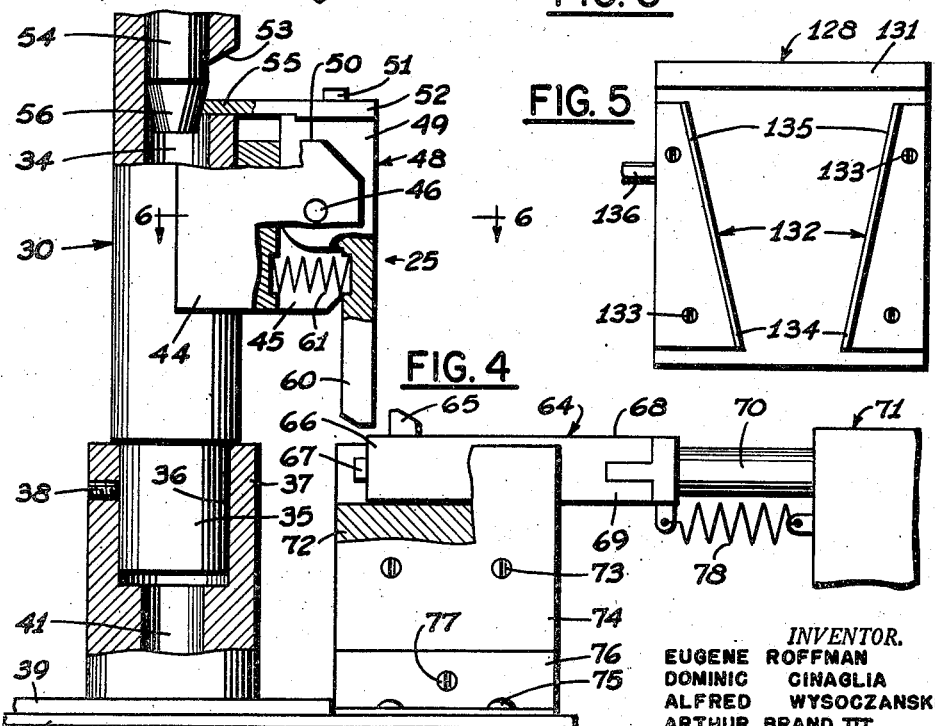
Fig. 4 is a side view, partly in section and partly broken away, taken along line 4—4 of Fig. 1 to show details of the sclerometer's automatic feed mechanism.

Feed mechanism 25 is best shown in Figs. 1 and 4. The major component of this mechanism is a hollow, cylindrical delivery tube 30 (see Figs. 4 and 6), the upper end 31 of which is connected in any convenient manner to the lower end 32 of a hollow flexible conduit 33 (see Fig. 1) leading from an automatically operating feed hopper (not shown). The passageway 34 through the delivery tube (see Fig. 4) and flexible conduit is of such dimension as to allow free movement therethrough, in an axial direction, of the bullet cores whose hardness is to be tested. The bullet cores are fed to flexible conduit 33 and delivery tube 30 in an end-to-end relationship, bases foremost, by the operation of the hopper. However, since the hopper, per se, is of conventional construction and operation and forms no part of the present invention, no further description of that part is necessary.

The lower end 35 of the delivery tube is reduced in diameter and is accommodated in an opening 36 in a boss 37 to which it is secured by means of the set screw 38 (see Fig. 4). This boss is mounted in any convenient manner upon a plate 39 which, in turn, is secured to a base plate 40 (see Figs. 1 and 4). Extending from the bottom of opening 36 through boss 37, plate 39, and base plate 40 is an opening 41 (see Fig. 4) which is continuous with passageway 34 of the delivery tube.

Welded or otherwise conveniently joined to the side of the delivery tube is a lug 44 (see Figs. 4 and 6) in which is formed the vertically extending groove 45. Pivotally mounted in this groove, as by means of pivot pin 46 which is secured in place by means of set screw 47, is a feed lever 48 (see Figs. 4 and 6). As shown in Fig. 4, the upper end 49 of this lever is somewhat above the top 50 of lug 44.

Adjustably secured to the upper end of the feed lever, as by a screw 51, is an arm 52 which projects through an opening 53 in the delivery tube's wall somewhat into the tube's passageway so as to prevent movement thereby of a bullet core 54 whose hardness is later to be tested, as is shown in Fig. 4. Notice in that figure that the inner end 55 of this arm is conveniently shaped to fit around a portion of the core's boat tail portion 56 and that arm 52 is also supported by the wall of the delivery tube.

In the operation of our machine, which will be described later under separate heading, feed lever 48 is pivotally movable about pin 46 so as to assume either one of two positions: a "blocking" position as shown in Fig. 4, or a "release" position (not shown, but evident from reference to Fig. 4). Since arm 52 is secured to feed lever and moves in accordance therewith, the arm also may be construed to occupy either a "blocking" or a "release" position.

When the feed lever is in the "blocking" position, the lower end 60 of this lever is urged away from delivery tube 30 by means of a coil spring 61 which is located in any convenient manner below pivot pin 46 and extends between groove 45 and the release lever. At the same time, upper end 49 of the feed lever, above the pivot pin, is urged toward the delivery tube. Note, in Fig. 4, that the upper portion of the feed lever, above the pivot pin, rests against the bottom of groove 45 in the delivery tube's lug 44. Because of this relationship, the outward movement of the lower end of the feed lever away from the delivery tube is limited.

With feed lever 48 in its "blocking" position, arm 52 secured thereto is also in its "blocking" position. At that time, inner end 55 of the arm rests upon the lower boundary of the delivery tube's opening 53, and projects somewhat into the delivery tube's passageway so as to prevent movement therepast of any bullet cores.

When the feed lever is in the "release" position, lower end 60 of this lever is positioned closer to the delivery tube than is shown in Fig. 4, thereby stressing coil spring 61, and upper end 49 of the feed lever is farther away from the delivery tube. Arm 52 secured to the top of the feed lever, therefore, is also in its "release" position, at which time the arm's inner end 55 no longer projects through opening 53 into the delivery tube's passageway to interfere with the passage therepast of the bullet cores.

The movement of the feed lever to its "blocking" or "release" positions is caused by the rectilinear movement of a tripping bar 64 toward or away from delivery tube 30. When the tripping bar is moved toward the delivery tube, a projection 65 at one end of the tripping bar strikes against lower end 60 of the feed lever and pushes that end of the lever about pivot pin 46 and toward the delivery tube. This movement of the feed lever compresses coil spring 61 and pivots the upper end 49 of the lever away from the delivery tube. Arm 52 carried by that end of the release lever is likewise moved away from passageway 34 of the delivery tube, allowing one bullet core to pass thereby.

When the tripping bar is moved away from the delivery tube, the feed lever assumes its "blocking" position. It is moved into that position, as was explained above, by the resilience of coil spring 61 which extends itself to assume its initial condition. Arm 52, secured to the upper end of the feed lever, moves back into opening 53 in the delivery tube so that the inner end 55 of the arm again projects into the delivery tube's passageway and thereby prevents passage of a bullet core therepast.

Tripping bar 64 (see Fig. 4) is merely a convenient length of metal, or other durable material, preferably having a quadrilateral cross section. Secured into the left end 66 of the tripping bar, as by means of the set screw 67, is the earlier mentioned projection 65 which extends a convenient amount above the bar's upper surface 68. The right end 69 of the tripping bar is adapted, in any convenient manner, for connection to the plunger 70 of a core feed solenoid 71 which will be described later.

As seen in Fig. 4, tripping bar 64 is mounted upon a support block 72 upon which it slides, so that the bar's upper surface 68 is slightly below the bottom of the feed lever's lower end 60 and so that the bar's projection 65 will abut the lever's lower end when the bar is moved toward delivery tube 30. Attached to support block 72, as by means of the screws 73, are side plates 74 whose function is to define the path of the tripping bar's reciprocation. The support block is secured to base plate 40 by means of screws 75 which pass through a mounting bracket 76 secured to the lower end of the support block as by means of a screw 77. This support block is so positioned upon base plae 40 that the path of the tripping bar 64 toward or away from delivery tube 30 is along a line passing through the axis of the delivery tube.

The rectilinear movement of tripping bar 64 toward the delivery tube is caused by the energization of core feed solenoid 71, to the plunger 70 of which the tripping bar is conveniently attached (see Fig. 4). This action stretches coil spring 78, one end of which is attached to the solenoid, and the other end of which is attached to the solenoid's plunger. Movement of the tripping bar away from the delivery tube is caused by the contraction of coil spring 78 as it resumes its initial condition after the solenoid has become de-energized.

The time between energization and de-energization of core solenoid 71 is so arranged that arm 52 is moved to its "release" and "blocking" positions so as to permit only one bullet core at a time to pass from delivery tube 30 into our electronic sclerometer.

Base plate 40, upon which feed mechanism 25 is supported, rests upon resilient mountings 79 (see Fig. 1) and is secured atop the cabinet 15 containing the remainder of our device in any convenient manner (not shown). This plate is so positioned on the cabinet that opening 41 in the feed mechanism is axially aligned with a similar opening (not shown) in the top of the cabinet. In this way, there is provided entrance into our sclerometer of bullet cores whose hardness is to be tested.

Another component of the feed mechanism is a transfer tube 80 (see Figs. 1 and 3). This tube is located on panel 22 inside cabinet 15 by means of a hanger block 81 which is secured to the panel by means of the screws 82 (see Fig. 1). As indicated in that figure, the transfer tube is in axial alignment with delivery tube 30 so that the transfer tube's passageway 83 is continuous with that of the delivery tube; and the upper end 84 of the transfer tube is close to the top of the cabinet.

In Figs. 1 and 3 it can be seen that the lower end 85 of the transfer tube leads to a structure which will be referred to as a hardness detecting transformer 86. The electrical aspects of this transformer will be discussed later under separate heading, but mechanically its construction is as follows.

A primary coil 90 (see Fig. 3) is accommodated in any convenient manner, in an opening (not shown) through a base block 91 made of polystyrene, or like material, which is secured to the cabinet's panel 22 in any convenient manner. Coil 90 is wound so as to have a central opening 92 of sufficient diameter to permit free passage therethrough of the bullet core being tested. Also accommodated in the base block's opening with primary coil 90 is an insulating disc 93 (see Fig. 3). This disc, also, is provided with a central opening 94 which is aligned with, and is substantially the same diameter as the primary coil's opening 92.

As Fig. 3 shows, the top surface of insulating disc 93 and the bottom surface of primary coil 90 are substantially uniplanar with the top and bottom surfaces, respectively, of base block 91. Resting atop insulating disc 93 is the hardness detecting transformer's secondary coil 95. This coil is substantially identical to primary coil 90 and, also like the latter coil, is wound so as to have a central opening 96 which is continuous with the central opening in the primary. The secondary coil is held in place by a top plate 97, also provided with an opening 98 in alignment with the secondary's central opening. This plate, as Figs. 1 and 3 show, is secured to base block 91 by means of screws 99.

From the description thus far and from Fig. 3, it will be apparent that a bullet core passing downward from feed lever 48 through transfer tube 80 will pass directly into the central openings of the primary and secondary coils of the hardness detecting transformer and, when stopped by mechanism later to be described, will become the core of that transformer.

Slider mechanism

The downward passage of the bullet core in relation to the hardness detecting transformer is stopped or allowed to continue depending upon the action of slider mechanism 26 (see Figs. 1 to 3). This mechanism is constructed upon a channel member 100 (see Figs. 1 to 3) which is secured in any convenient manner to panel 22 so as to abut the bottom surface of base block 91, and so that an opening 101 in the channel member (see Fig. 3) is in alignment with opening 92 in the transformer's primary coil. This opening is sufficiently large to permit free passage of the bullet core therethrough.

Secured as by screws 102 (see Fig. 1) on each side within channel member 100 is an L-shaped runner 103 (also see Figs. 2 and 3). These runners are so spaced from the web 104 of the channel member as to support a slide plate 105 (see Figs. 2 and 3).

Secured to the lower surface of the slider plate, at its left end, is a bracket 106 (see Figs. 1 to 3) to which a stop bar 107 is attached as by means of a screw 108 (see Fig. 2). As shown, this stop bar projects upward somewhat above web 104 of the channel member, and serves to limit the movement of the slider plate toward the right (in reference to Figs. 1 and 3). The aforementioned movement of slider plate 105 will be discussed later. Cemented, or otherwise conveniently attached, to stop bar 107 is a pad 109 of hard rubber, or like material, which lessens the impact between stop bar 107 and channel member 100.

Projecting downward from the slider plate's lower surface near its right end (see Fig. 3) is a stud 110 to which one end of a coil spring 111 is attached. For convenience of operation, this stud is located half way across the width of slider plate 105.

Also secured to the slider plate's lower surface, intermediate bracket 106 and stud 110, is a plate 112 (see Figs. 2 and 3) containing a hardened insert 113 (see Fig. 3) which is accommodated in an opening in the slider plate. As there shown, the top surface of this insert is flush with the surface of the slider plate. This insert is so located in the slider plate as to be directly beneath the channel member's opening 101 when the slider plate is at the right end of its travel (with reference to Figs. 1 and 3).

Somewhat to the right of insert 113, slider plate 105 is provided with an oblong opening 114 whose full length may be seen in Fig. 3. This opening is of sufficient width to allow free passage therethrough of a bullet core whose hardness has been tested. The length of this opening can be any convenient dimension greater than the bullet core's diameter to produce satisfactory release of the bullet core from the hardness detecting transformer.

Attached to one side of channel member 100, as by means of earlier-mentioned screws 102, is an L-shaped arm 116 (see Figs. 1 to 3). This arm projects beyond the right end of the channel member (see Fig. 3), then turns inward toward panel 22 (see Fig. 2). Located in this arm so as to be in alignment with the slider plate's stud 110 is an anchor pin 117 to which the other end of coil spring 111 is attached. Thus, slider plate 105 is constantly pulled toward the right as viewed in Figs. 1 and 3.

During the operation of our device, slider plate 105 has reciprocating motion from right to left and vice versa (see Figs. 1 and 3) to either one of two positions: a "blocking" position, best shown in Fig. 3, in which the slider plate is at the right end of its travel, or a "release" position (not shown, but evident from Fig. 3) in which the slider plate is at the left end of its travel.

When the slider plate is in the "blocking" position (see Fig. 3), insert 113 is directly beneath the channel member's opening 101 and will, as a result, stop the passage of a bullet core in the hardness detecting transformer. When the slider plate is in the "release" position, oblong opening 114 is beneath the channel member's opening and will, as a result, allow the bullet core to fall from the hardness detecting transformer to either the "accept" chute 120 or the "reject" chute 121 depending upon whether or not the bullet core's overall hardness, as determined by the hardness detecting transformer, is acceptable. The chutes, per se, will be described later.

The reciprocation of slider plate 105 to its "blocking" or "release" position is caused by the energization or de-energization of a slider solenoid 122 (see Fig. 1) to whose plunger 123 slider plate 105 is connected by means of an adjustable link 124 (see Figs. 1 and 3). Energization of the slider solenoid moves the slider plate to its "release" position, thereby elongating coil spring 111. De-energization of the solenoid allows this spring to pull the slider plate back to its "blocking" position.

As will later be explained under separate heading, the movement of the slider plate to the "blocking" position closes an electrical circuit through a switch 125, and movement of the slider plate to the "release" position opens the electrical circuit through that switch.

Accept-reject mechanism

Accept-reject or classifying mechanism 27 is shown in Figs. 1 and 3 where it can be seen to comprise, essentially, a deflecting vane 128, an "accept" chute 120, and a "reject" chute 121.

Figure 5:
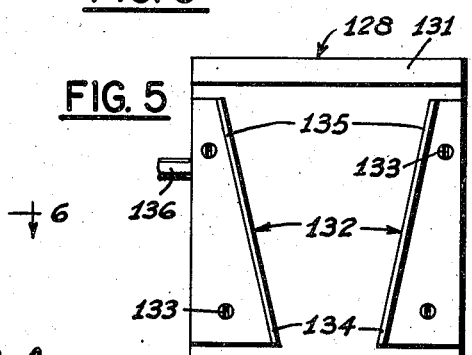
Fig. 5 is a side view taken along line 5—5 of Fig. 3 and showing the construction of the sclerometer's deflecting vane.

Deflecting vane 128 can be seen in Figs. 1, 3 and 5. This vane is merely a flat, thin plate whose upper end 131, i.e. toward slider mechanism 26 (see Figs. 1 and 3), is sloped toward the right end of that mechanism. Secured to the left face of this vane (see Figs. 1 and 3), and spaced apart from each other (see Fig. 5), are the L-shaped guide plates 132. As shown in Fig. 5, these plates are secured to the vane by screws 133; they extend lengthwise of the vane, and are closer together at their lower ends 134 than they are at their upper ends 135.

Secured in any convenient manner to the right face of the vane are a pivot pin 136 and a lug 137 (see Figs. 1 and 3). The pivot pin extends horizontally across the vane's width approximately midway its length and pivots in a plate 138. Lug 137 is located somewhat above pivot pin 136 and is connected, as by a pin 139, to a plunger 140 of a reject solenoid 141 (see Fig. 1).

Plate 138, to which deflecting vane 128 is pivotally mounted, is secured in any convenient manner (not shown) to panel 22 just below slider mechanism 26 (see Figs. 1 and 3). This plate is so positioned that the channel member's opening 101 is centralized over the space between the vane's guide plates.

In the operation of our device, deflecting vane 128 is capable of moving arcuately about its pivot pin 136 to assume either one of two positions: a "vertical" position (see Figs. 1 and 3), or an "inclined" position (not shown).

When in the "vertical" position, the deflecting vane and its guide plates are in alignment with the upper end 142 of "accept" chute 120. As a result, when the deflecting vane is in the "vertical" position and the slider plate is moved to its "release" position, a bullet core falling from the hardness detecting transformer will drop vertically downward and be directed into "accept" chute 120 which delivers the core to an appropriate receptacle.

When the deflecting vane is in the "inclined" position, the vane has been pivoted about pin 136 so that the vane's upper end 131 has been moved toward the right away from the position shown in Figs. 1 and 3, and the vane's lower end 143 has been moved toward the left away from stop pin 144 which is contained in plate 138. As a result, when the deflecting vane is in the "inclined" position, the vane and its guide plates are in alignment with upper end 145 of "reject" chute 121 so that, when slider plate is moved to its "release" position, a bullet core falling from the hardness detecting transformer will be directed by the vane into the "reject" chute which delivers that core to a different receptacle.

Movement of the deflecting vane to its "vertical" or "inclined" positions results from energization or de-energization of reject solenoid 141. The electrical aspects of the solenoid's operation will be discussed under separate heading later, but mechanically the action is as follows. When the solenoid is energized, its plunger 140 pulls the deflecting vane to the "inclined" position and compresses coil spring 146 (see Figs. 1 and 3) one end of which is attached in any convenient way to the plunger, while the other end rests against the solenoid's housing. When the solenoid is de-energized, coil spring 146 elongates thereby pushing the deflecting vane back to its "vertical" position against stop pin 144.

"Accept" chute 120 is shown in Figs. 1 and 3. This chute is supported in blocks 150 which are secured to panel 22 in any convenient manner, as by the screws 151 (see Fig. 1). The upper end 142 of this chute is positioned below slider plate 105 in direct alignment with the channel member's opening 101 (see Fig. 3), while the chute's lower end 152 extends somewhat beyond cabinet's boundary. The purpose of this chute is to conduct bullet cores, whose hardness has been found by our device to be satisfactory, away from the hardness detecting transformer into an appropriate receptacle.

"Reject" chute 121 is shown in Figs. 1 and 3. This chute is supported in blocks 153 which, like blocks 150, are secured to panel 22 as by screws 154 (see Fig. 1). The upper end 145 of this chute is located adjacent to the upper end of chute 120, and is so positioned in relation to deflecting vane 128 that a bullet core dropping from the hardness detecting transformer, and properly directed by the deflecting vane, will pass into the "reject" chute. The lower end 155 of this chute (see Fig. 1) extends somewhat beyond the boundary of cabinet 15. In practice, the purpose of the "reject" chute is to conduct bullet cores, whose hardness has been found by our device to be unsatisfactory, away from the hardness detecting transformer into another appropriate receptacle.

The mechanical action of our electronic sclerometer can, in a condensed fashion, be epitomized in the following way. Visualize flexible conduit 33 as extending from a mechanically operated hopper (not shown) to delivery tube 30. This hopper, as earlier mentioned, operates in well-known manner to provide to our machine a continuous supply of bullet cores whose hardness is to be tested. Extending from the hopper to arm 52 there thus is a row of bullet cores to be tested, positioned in end-to-end relationship with the bases foremost. When our tester is in operation, arm 52 moves to its "release" position and thereby allows one bullet core to fall into the hardness detecting transformer 86. Almost instantaneously, the bullet core's hardness is electronically determined, in a manner which will be described later, and slider plate 105 moves to its "release" position allowing the bullet core tested to fall therepast. Depending upon the hardness of the bullet core, it will be caused to fall into either the "accept" or the "reject" chute which leads the tested bullet core to an appropriate receptacle. After the thus tested bullet core has dropped from the hardness detecting transformer, the slider plate returns to its "blocking" position. The feed mechanism then releases one more bullet core to the hardness detecting transformer, and the above actions are repeated.

ELECTRICAL ASPECT

The electrical aspect of our sclerometer is summarily indicated by the schematic presentation shown in Fig. 7. Those skilled in the art realize that this schematic, which is composed of commonly used electrical symbols, is not intended to indicate the actual positional relationship between the various electrical components, the actual wiring arrangement with which they are connected, nor the particular value of their respective electrical characteristics. Instead, this representation indicates only the electrical association between the various components.

However, before describing the various circuits, it may be well to consider the schematic Fig. 7 as a whole, and thereby to become acquainted with the various electrical components involved.

Starting at the right side of the figure are fuses 160 and 161. One side of each fuse 160—161 is connected to an available source of alternating current (not shown). The other sides of these fuses are connected to the legs 162 and 164 of the single throw, double pole switch 163.

The other end of leg 162 is connected by a lead 165 to a binding post 166 of a voltage regulating unit 167, and the other end of leg 164 is connected by a lead 168 to a binding post 169 of the voltage regulating unit. Thus, leads 165 and 168 form the power input of voltage regulating unit 167. Since the purpose and operation of voltage regulating units is well known to those skilled in the art, no details of the particular type used here need be included in this description. It will be sufficient to say that there is a substantially constant A.C. potential, 115 volts in the present instance, across its output.

For practical purposes, legs 162 and 164 are manually operable simultaneously, thus enabling switch 163 to serve as an off-on switch for our device. In other words, voltage regulating unit 167 is placed across the available source of electricity depending upon whether switch 163 is open or closed. Note switch 163 in Fig. 1.

Before lead 165 reaches voltage regulating unit 167, it is tapped by another lead 170. Also, before lead 168 reaches the voltage regulating unit, it is tapped by leads 171 and 172 which are shown as originating from the same point. Lead 170 goes to one side of core feed solenoid 71, lead 171 goes to the contact 173 of a relay 174, and lead 172 goes to the binding post 175 of an electro-mechanical timer unit 176. Notice, too, in connection with lead 172, a relay 177 which is connected between that lead and the binding post 178 of the timer unit.

Connected across leads 170 and 171 are the earlier-named core feed solenoid 71, slider solenoid 122, and reject solenoid 141, the counter solenoid 179, and the aforementioned timer unit 176.

Assuming switch 163 to be closed, the circuit through core feed solenoid 71 is made or broken by the action of movable contact 180 relative to the contact 173, these elements forming part of relay 174; or by the action of the movable contact 181 relative to the contact 182, these elements forming part of relay 177.

The circuit through slider solenoid 122 is made or broken by a switch 183 (also see Fig. 1), or by the action of movable contact 184 relative to contact 185, these last two elements forming part of a relay 186.

The circuit through reject solenoid 141 is made or broken by the action of movable contact 187 relative to contact 188, these elements forming part of a relay 189.

The circuit through counter solenoid 179 is made or broken by the action of movable contact 190 relative to contact 191, these elements forming part of relay 186.

The circuit through timer unit 176 is dependent upon switches contained within that unit, and also upon the action of movable contact 192 relative to contact 193, these last two elements forming part of earlier-named relay 189. More will be said about the timer unit later under separate heading.

Connected across the output of voltage regulator 167 are leads 194 and 195. Connected across these leads, in turn, are the primary 196 of a filament transformer 197, primary 90 of hardness detecting transformer 86, the primary 198 of a balancing transformer 199 (this primary is series-connected in phase with the primary of the hardness detecting transformer), and the primary 200 of an isolation transformer 201. Primary 196 of the filament transformer is connected across the voltage regulator's output without a switch, and thus it is energized as soon as switch 163 is closed.

The circuit through the primaries 90 and 198 of the hardness detecting and balancing transformer, respectively, is made or broken by the action of movable contact 202 relative to contact 203, these elements forming part of relay 177.

Primary 200 of the isolation transformer, like the primary of the filament transformer, is also connected across the voltage regulator without a switch, and thus is energized as soon as switch 163 is closed.

In usual fashion, primary 196 of the filament transformer induces an appropriate voltage in the secondary 204 of that transformer, primary 90 of the hardness detecting transformer induces a voltage in secondary 95 of that transformer, primary 198 of the balancing transformer induces a voltage in the secondary 205 of that transformer (actually secondaries 95 and 205 are series-connected out of phase), and primary 200 of the isolation transformer induces a voltage in the secondary 206 of that transformer.

Secondary 204 of the filament transformer supplies current to the filament 207 of electron tube 208, and for the filaments 209 and 210 of the electron tubes 211. As it is well-known practice, the connection between those filaments and secondary 204 of the filament transformer is not shown.

Because secondary 95 of hardness detecting transformer 86 and secondary 205 of balancing transformer 199 are series-connected 180 degrees out of phase, the voltage output across lead 212 connected to one end of secondary 95 and lead 213 connected to one end of secondary 205 will be the difference between the outputs of the individual secondaries. As will later be shown, the output across the hardness detecting transformer's secondary 95 is matched against or combined with the output of the the balancing transformer's secondary 205 and the difference or the sum between the two serves as a basis for indicating whether or not the overall hardness of each bullet core tested is acceptable or unacceptable.

Continuing the survey of the schematic diagram shown in Fig. 7, it will be noticed that representative bullet 54 serves as the core of hardness detecting transformer 86, and representative bullet 214 serves as the core of balancing transformer 199. For ease of calibration and obtaining a zero voltage output across the secondaries of those transformers, these cores should be of substantially the same size, shape, and composition of material. Those skilled in the art know that the respective voltages induced in the secondaries of the hardness detecting and balancing transformer depend, other things being equal, upon the material, size, shape, and hardness of the respective cores.

Leads 212 and 213 are connected to a voltage doubler circuit comprising the duo-diode type electron tube 211, and capacitors 215 and 216. The output of the doubler circuit is then dropped across resistor 217 and is applied to the control grid 219 of electron tube 208 through resistor 218. In order to be able to read the voltage across resistor 217, we have provided electric meter 18 and cut-in switch 220 (also see Fig. 1) and ballast resistor 221. Switch 220 is normally open during the operation of our device, but can be closed, at will, for the purpose mentioned above.

Later in the discussion pertaining to this schematic, it will be noticed that control grid 219 of electron tube 208 is biased by a potential which is supplied by another source, thus far not referred to. Before elaborating upon this, however, let us examine secondary 206 of isolation transformer 201.

Secondary 206 of isolation transformer 201 is connected to a voltage doubling circuit comprising selenium rectifiers 230 and 231, and capacitors 232 and 233. Connected across the voltage doubling circuit and ground (300 v. D.C.) are two parallel circuits.

In one circuit, fed by lead 234 through resistor 235 and potentiometer 236, is relay 186 which is energized or de-energized depending upon the position of the movable contact 237 relative to contact 238 (these last two elements forming part of the relay 239). Note also in this circuit capacitor 240, one side of which is connected between resistor 235 and potentiometer 236 and the other side of which is grounded, and capacitor 241 is connected across relay 186. The purpose of these capacitors will be explained later.

In the other parallel circuit connected across the last-named voltage doubling circuit and ground, and fed by lead 242 through choke coil 243 and resistor 244 across which there is a total voltage drop of 150 volts, there is the voltage regulating tube 245.

Connected between the plate 246 of voltage regulating tube 245 and ground are two parallel circuits: the first circuit is fed by lead 247, and the second circuit is fed by lead 248.

In the first circuit are switch 125, relay 239, and resistor 249. Note also in this circuit, capacitor 250, one side of which is connected between switch 125 and relay 239, the other side of which is connected to ground. As indicated in the schematic, this circuit through relay 239 is made or broken depending upon whether or not switch 125 is open or closed. Whether or not this switch is open or closed depends, in turn, upon the position of slider plate 105. As earlier mentioned, switch 125 is opened by the slider plate as it moves to its "release" position, and is closed by its own operation when the slider plate moves to its "blocking" position.

Series-connected between lead 247 and ground, and fed by the lead 257, are the resistors 251 and 252, contact 253 and movable contact 254 (these last two named elements forming part of relay 239), and capacitor 255. Note also this branch capacitor 256, one side of which is connected between resistors 251 and 252, and the other side of which is connected to ground. This circuit is open or closed, depending upon the position of movable contact 254 relative to contact 253.

Also series-connected between lead 247 and ground, and fed by the lead 260, are the resistor 261, relay 189 and the plate 262 of electron tube 208. The circuit through this branch depends upon the position of movable contact 263 relative to contact 264, these elements forming part of relay 239, and also upon whether or not electron tube 208 is conducting. Note also in this circuit capacitor 265, one side of which is connected between resistor 261 and the relay's contact 264, and the other side of which is connected to ground.

In the second parallel circuit connected between plate 246 of voltage regulating tube 245 and ground are the series-connected resistors 266, 267, and 268, a potentiometer 269, and resistor 270. Note also, in this circuit, capacitor 271, one side of which is connected between resistors 266 and 267, and the other side of which is connected to ground, and switch 272 connected across resistor 268.

From the schematic, it can be seen that relay 239 will be energized when its circuit is completed by the closing of switch 125. As earlier mentioned, the closing of this switch takes place when slider plate 105 is in its "blocking" position. When the circuit through relay 239 is closed, capacitor 250 is charged, and slider plate 105 is moved to its "release" position; when the circuit through relay 239 is broken by the action of slider plate 105 against switch 125, capacitor 250, in discharging through relay 239, delays the return of the slider plate to its "blocking" position. Also, when relay 239 is energized, movable contact 254 moves away from contact 253 to contact 273, contact 237 moves away from contact 276 to contact 238, and movable contact 263 moves against contact 264.

Movement of the movable contact 254 to contact 273 allows capacitor 255, which had been charged while movable contact 254 was against contact 253, to discharge through relay 174 and through potentiometer 274 and the series-connected resistor 275. The rate of discharge of capacitor 255 is controlled by the resistance of potentiometer 274 which can be regulated by the core feed adjustment 285 (also see Fig. 1).

Movement of movable contact 237 to contact 238 closes the circuit through lead 234 and its various complements earlier mentioned, through relay 186 and also charges capacitor 241.

When movable contact 263 moves against contact 264, the circuit through relay 189 is closed at that point. However, unless electron tube 208 is conductive, the circuit is not complete, and relay 189 is not energized.

When slider plate 105 moves to its "release" position, thereby opening switch 125, the circuit through relay 239 is broken with the consequent de-energization of that relay. When relay 239 is de-energized, movable contact 254 moves away from contact 273 and to contact 253, movable contact 237 moves away from contact 238 and to contact 276, and movable contact 263 moves away from contact 264.

When movable contact 254 is against contact 253, capacitor 255 is charged as is capacitor 256, and relay 174 is de-energized. When movable contact 237 moves away from contact 238 and against contact 276, capacitor 241 is allowed to discharge through resistor 277, and relay 186 becomes de-energized.

When movable contact 263 moves away from contact 264 the circuit through relay 189 is broken.

Relay 174, as earlier mentioned, is energized by capacitor 255 as it discharges when movable contact 254 is against contact 273, and is allowed to become de-energized when movable contact 254 moves away from contact 253.

When relay 174 is energized, movable contact 180 moves against contact 173, thereby closing at that point, the circuit of feed solenoid 71. When relay 174 is de-energized, movabe contact 180 moves away from contact 173 and thereby opens the circuit at that point of feed solenoid 71. Notice, too, that the circuit through the feed solenoid also depends upon whether or not movable contact 181 is against contact 182 (these elements forming part of relay 177 which will be discussed later).

Relay 186 will be energized when movable contact 237 moves against contact 238. The rate of energization of relay 186 is dependent upon the setting of potentiometer 236 through the operating rate adjustment 284 (also see Fig. 1). That solenoid, on the other hand, will become de-energized when movable contact 237 moves against contact 276. When relay 186 is energized, movable contact 184 moves against contact 185, thereby closing the circuit (assuming switch 183 to be closed) through slider solenoid 122, and movable contact 190 moves to contact 191, thereby closing the circuit through counter solenoid 179.

When relay 186 is de-energized, movable contact 184 moves away from contact 185, thereby breaking the circuit through slider solenoid 122, and movable contact 190 moves away from contact 191, thereby breaking the circuit through counter solenoid 179.

Relay 189 will be energized after relay 239, having been energized, moves its movable contact 263 to contact 264, and also when electron tube 208 is made conductive as a result of there being a bullet core of unacceptable hardness in hardness detecting transformer 86. When relay 189 is energized, movable contact 187 moves to contact 188 thereby closing the circuit through reject solenoid 141, and movable contact 192 moves away from contact 193 thereby opening the circuit through leads 286 and 288 which are connected to timer unit 176. As will later be shown, opening this circuit to the timer unit causes that unit to be restored to its "quiet" condition if, previous to that time, it is in the "active" condition. Otherwise, the opening of this circuit will have no influence on the timer unit.

Relay 189 will be de-energized when relay 239 is de-energized, or relay 189 will be de-energized when electron tube 208 is non-conductive. When that relay is in a de-energized condition, movable contact 187 is away from contact 188, thereby breaking the circuit through reject solenoid 141, and movable contact 192 is against contact 193, thereby closing the circuit across leads 286 and 288 to timer unit 176.

Relay 177 will be energized when, by action occurring automatically within the timer, the circuit across leads 172 and 288 is completed. When relay 177 is energized, movable contact 181 moves away from contact 182, thereby breaking the circuit through feed solenoid 71, and movable contact 202 moves away from contact 203, thereby breaking the circuit across primary 90 and its in-phase, series-connected primary 198 of the hardness detecting and balancing transformers, respectively.

Relay 177 will be de-energized when the circuit through that relay is broken by action occurring within the timer as a result of the movement of movable contact 192 away from contact 193 (these last two named elements forming a part of relay 189). When relay 177 is de-energized, movable contact 181 moves against contact 182, thereby closing the circuit at that point through feed solenoid 71, and movable contact 202 moves against contact 203, thereby closing the circuit through primaries 90 and 198 of the hardness detecting and balancing transformers, respectively.

The position of balancing transformer 199 in our sclerometer is shown in Fig. 1. As there shown, primary 198 and secondary 205 of this transformer are located between a bottom plate 278 and a top plate 279. These plates are tied together by means of screws 280. Top plate 279, like plate 97 of hardness detecting transformer 86, is provided with an opening (not shown) through which an unhardened bullet core 214 is inserted into the balancing transformer. Bottom plate 278, on the other hand, is without an opening and serves to support the unhardened bullet core in the balancing transformer. The bottom plate, further, is secured in any convenient manner to a bracket 281 which, in turn, is secured (as by screws 282) to the cabinet's panel 22.

Preparing the sclerometer for operation

Before the hardness of any bullet cores can be tested in our device, certain initial settings of sensitivity level control 283, operation rate control 284, and core feed rate control 285 must be made. These controls, as earlier pointed out, are near the bottom of front panel 16 (see Figs. 1 and 7).

Adjustment of sensitivity level control 283 changes the bias voltage applied to grid 219 of tube 208 which, in effect, determines the hardness level of the machine so that bullet cores found to have a hardness at or below that level automatically will be separated from those found to have a hardness above that level.

Adjustment of operation rate control 284 changes the resistance of potentiometer 236 which, in effect, determines the rate of reciprocation per time interval of slider plate 105.

Adjustment of core feed rate control 285 changes the resistance of potentiometer 274. This, as a result, varies the length of time that core feed solenoid 71 is energized. Obviously, it is desired to have the core feed solenoid energized only long enough to allow one bullet core at a time to pass from delivery tube 30 to hardness detecting transformer 86. From the schematic diagram of Fig. 7, it will be apparent that the action of the core feed solenoid is interlocked with the action of the slider plate so that synchronism between those two parts is maintained.

To properly set sensitivity level control 283 (assuming switch 163 to be closed) switch 183 on panel 22 is manually opened. This action opens the circuit through slider solenoid 122 allowing spring 111 to hold slider plate 105 in its "blocking" position. An unhardened bullet core, having the same size and shape and made of the same material as the bullet cores whose hardness is to be tested, is placed in balancing transformer 199 in the same position as each bullet core whose hardness is to be tested will have in hardness detecting transformer 86.

A bullet core (not shown), which is known to have a hardness equivalent to the hardness level for which the machine is to be set, is then placed in the hardness detecting transformer, and sensitivity level control 283 is manually adjusted until electron tube 208 becomes conductive. This is evidenced by energization of reject solenoid 141 which moves deflecting vane 128 to its "inclined" position.

After the hardness level is thus set, when the hardness detector is in operation the result will be that all bullet cores found to have a hardness at or below that level will be sorted into one group, and all bullet cores found to have a hardness above that level will be sorted into another group.

After the sensitivity level control has been set, switch 183 is manually closed, and operation rate control 284 is adjusted so that slider plate 105 reciprocates at a satisfactory rate. This, in other words, means that the slider plate will move to its "release" position and return to its "blocking" position at the same rate, thereby allowing a predetermined number of bullet cores per minute to be tested.

Next, core feed rate control 285 is adjusted so that feed mechanism 25 will allow only one bullet core at a time to pass from delivery tube 30 into hardness detecting transformer 86. As earlier mentioned, the operation of the feed mechanism is integrated with the reciprocation of slider plate 105 so that synchronism between those parts is always maintained.

Finally, timer unit 176 is manually set through means incorporated therein, to become "active" at preselected intervals, as, for example, every fifteen minutes during the sclerometer's operation. As earlier explained, when this timer is "active" it serves to check the operation of the electrical circuitry and affiliated mechanical components of the reject portion of our device. If everything is in proper order, the timer automatically is restored to its "quiet" condition, and the operation of our device continues. If a fault is detected, timer 176 will not be restored to its "quiet" condition until the fault is corrected.

After these initial adjustments of our hardness detector have been made, flexible conduit 33 leading from the mechanically operated feed hopper (not shown) is attached in any convenient manner to delivery tube 30, and the hardness detecting and subsequent sorting of bullet cores from the hopper will proceed automatically.

OPERATION

By gravity, bullet cores whose hardness is to be tested pass in an end-to-end relationship from the feed hopper (not shown), through flexible conduit 33, to delivery tube 30 where their passage is interrupted by feed mechanism 25. As this mechanism operates, one bullet core at a time is allowed to drop past the feed mechanism into hardness detecting transformer 86 where its fall is again stopped by slider plate 105 which, at that time, will be in its "blocking" position. Once in the hardness transformer, a determination almost instantaneously is made as to whether the bullet core's overall hardness is within the preselected tolerance limits. After the bullet core's hardness has been determined, slider plate 105 moves to its "release" position, allowing the bullet core to fall from the hardness detecting transformer. In the meantime, however, deflecting vane 128 has been moved to either its "inclined" or its "vertical" position depending upon whether or not the bullet core's hardness has been found to be acceptable or unacceptable. If the hardness of a bullet core is found acceptable, deflecting vane immediately assumes its "vertical" position, and, as that core is allowed to fall from the hardness detecting transformer by the action of slider plate 105, the bullet core falls into chute 120 which leads it from our device into an appropriate receptacle. If the hardness of a bullet core is found unacceptable, deflecting vane assumes its "inclined" position and, as that bullet core is allowed to fall from the hardness detecting transformer, the bullet core is directed by the deflecting vane into chute 121 which leads it from our device into a different receptacle.

After the first bullet core has been tested, slider plate 105 returns to its "blocking" position, a second bullet core is released by the feed mechanism, and the hardness detecting and segregating operations are repeated.

The time unit 176 is introduced into the circuit of the hardness tester in order to provide means for detecting a failure in the operation of the reject mechanism. The timer functions in a manner such that it will go into operation at regular intervals. For this purpose, a timer of any suitable or conventional type may be used. Generally speaking, the timer comprises an electro-mechanical apparatus consisting of electro-mechanical switches which are energized from a source of alternating current at regular intervals, e.g., every fifteen (15) minutes.

When the time interval has elapsed, a contact closes, and the source voltage is placed across a relay 177. When the coil of relay 177 is energized, the following action takes place: (1) contact 182 is removed from contact 181 thereby opening the circuit of core feed solenoid 71. When the voltage is not available for core feed solenoid 71, no more cores will be dropped into the test position; (2) contact 203 is removed from contact 202 thereby opening the primary circuit of the hardness detecting transformer. This action removes the negative signal (output voltage of the transformers) from the control grid of the thyratron tube 208. Therefore, under normal operating conditions, the tube will fire or pass a current through the anode 262. When the tube fires, reject relay 189, which is in the anode circuit of the thyratron tube, is energized, causing the following to happen: (1) contact 187 engages contact 188, thereby placing a voltage across reject solenoid 141 to move the deflecting vane to the reject position; (2) contact 193 is removed from contact 192, thereby opening the source voltage circuit to the timer unit 176. As a result of this latter action, the voltage originally applied by the timer unit to relay or electro-mechanical switch 177 is removed thereby to reset the apparatus to normal operating conditions. It will be appreciated, that, if the apparatus did not return to normal operating conditions, the core feed solenoid 71 would remain inoperative and prevent any cores from entering the core feed tube or delivery tube 30 and testing would cease. The operator, seeing this stoppage, would know there was something at fault in the circuit of the thyratron-activated control system. As a consequence, the thyratron tube will not fire or pass a current and the timer unit will not be reset before the trouble is rectified.

From the foregoing description, it will be apparent that we have provided a quick-acting electronic sclerometer whose action depends upon the difference in output between two transformers whose primaries are connected in series-aiding relationship, and whose secondaries are connected in series-opposed relationship; that we have provided a sclerometer which will automatically segregate the material of unacceptable hardness from that having acceptable hadness; that we have provided a sclerometer capable of great sensitivity; that we have provided a sclerometer capable of adjustment so as to be operable over a wide range of the hardness scale; that we have provided a sclerometer which will indicate the overall hardness of material in distinction to sclerometers which indicate hardness at only one spot on the material; that we have provided a sclerometer in which the surface of the material tested is not marred or dented by the sclerometer's action; and that we have provided a sclerometer whose accuracy is automatically checked at preselected intervals of time during its operation.

Our invention is amenable to numerous modifications and variations, by those skilled in the art, without departing from its original spirit and scope. For example, we realize that primaries of the hardness detecting and balancing transformers could be connected in series-opposed relationship while the secondaries of those transformers are connected in series-aiding relationship. It would also be possible, too, by making non-inventive changes, for the ordinary skilled technician to make our sclerometer work by having the primaries of the hardness detecting transformers connected in series-aiding relationship while the secondaries are also in series-aiding relationship; or conversely, by having the primaries connected in series-opposed relationship while the secondaries are also connected in the same relationship. For these and other reasons, we do not wish to be limited in the protection afforded by the patent system to the embodiment here presented for illustrative purposes only, but rather by the breadth and scope of the appended claims.

We claim:

1. In a machine for acting on components wherein use is made of a conduit through which the components are delivered to the machine, a feed mechanism for releasing said components one by one from said conduit, comprising, a hollow delivery tube vertically connected at one end to said conduit and having an opening extending laterally from the tube's exterior through its sidewall to its interior passageway, a lug protruding laterally from said tube's exterior, a feed lever pivotally mounted on said lug, an arm carried by said feed lever and capable of being pivoted thereby into and out from the lateral opening in said tube's sidewall so as selectively to block movement of said components therepast, a spring compressedly mounted between said lug and said feed lever so as constantly to urge that level away from the lug and likewise thereby tend to move said arm into its passage-blocking position within said tube, a tripping bar mounted for reciprocating movement toward and away from said tube's sidewall, a projection carried by said tripping bar for striking said feed lever and at such times causing it to pivot against said spring and cause said arm to move out of its tube passage-blocking position, a solenoid, a plunger connected at one end to said tripping bar and at the other end to said solenoid so that whenever the solenoid becomes energized the plunger moves the tripping bar and its projection against said feed lever, and a spring stressed between said tripping bar and a fixed part of said machine so that whenever the solenoid becomes de-energized the tripping bar and plunger will be brought back away from said feed lever, whereby through controlled alternate energization and de-energization of said solenoid at appropriate intervals the cylindrical components will be caused to pass through said feed mechanism one at a time at a preselected rate.

2. The machine of claim 1 plus an electromagnetic testing means disposed in the path from the hollow delivery tube's exit end so constructed and arranged as to receive for relative hardness testing purposes each of the components passing from the delivery tube, a slider plate reciprocally mounted so as intermittently to block the exit end of said testing means long enough to allow the relative hardness of the components passing therethrough to be detected thereby, and a slider plate solenoid interconnected with the feed mechanism solenoid so that when said slider plate solenoid is de-energized said slider plate blocks the exit from said testing means and when energizd moves the plate so as to open that exit, whereby through controlled alternate de-energization and energization of the feed mechanism solenoid and of said slider plate solenoid at appropriate intervals the components will be caused to pass through the feed mechanism and said testing means one at a time at a preselected rate.

3. The machine of claim 1 plus an electromagnetic detecting means disposed in the path from the delivery tube's exit end so as to receive for relative average hardness detecting purposes each of said components passing from said tube, a pivotally mounted deflector vane normally positioned below said detecting means so that components passing by that means whose hardness is determined by said detecting means to be "acceptable" as above a predetermined minimum will move in one direction whereas components whose hardness is determined to be below that minimum will be "rejected" and shunted in another direction by pivoting of the vane to an other than normal position, a reject solenoid for pivoting said deflector vane electrically connected to said detecting means and when energized causes that vane to move from its normal "accept" position to the "reject" position, whereby through controlled alternate energization and de-energization of the feed mechanism solenoid and of said reject solenoid at appropriate intervals the components will be caused to pass through the machine one at a time at a preselected rate and separated into two groups dependent upon their having an average hardness above or below a preselected minimum.

4. The machine of claim 1 adapted for automatically detecting the relative hardness of magnetic components by virtue of their magnetic permeability when placed in an electromagnetic field and then separating those components having an average hardness above a preselected minimum from those having an average hardness below that minimum plus an electromagnetic detecting means disposed in the path from the delivery tube's exit end so as to receive for relative hardness detecting purposes each of said components passing from said tube, a slider plate reciprocally mounted so as intermittently to block the exit end of said detecting means long enough to allow the relative hardness of the components passing therethrough to be detected thereby, a slider plate solenoid which when de-energized causes said slider plate to block the exit from said detecting means and upon energization moves that plate to open that exit, a pivotally mounted deflector vane normally positioned below said detecting means and slider plate so that components passing that means whose hardness is determined by said detecting means to be "acceptable" as above a preselected minimum will move in one direction whereas components whose hardness is determined to be below that minimum will be "rejected" and shunted in another direction by pivoting of said deflector vane to an other than normal position, a reject solenoid for pivoting said deflector vane electrically connected to said detecting means and when energized causes that vane to move from its normal "accept" position to the "reject" position, whereby through controlled alternate energization and de-energization of the feed mechanism solenoid and of said slider plate and reject solenoids at appropriate intervals the components will be caused to pass through the machine one at a time at a preselected rate and to be separated into two groups dependent upon their having an average hardness above or below a preselected minimum.

5. The combination of detecting and balancing transformers having their primary coils in series adding relation and their secondary coils in series opposing relation, said both secondary coils being the air core type such that one of the secondary coils is adapted to receive a specimen of known permeability and the other secondary coil is adapted to receive a test specimen, means including a slidable member biased to a stop position whereby a test specimen is maintained by said member in the core of said other secondary coil and operable to a position for releasing said test specimen, means for admitting a specimen one at a time to said other secondary coil, and means responsive to said slidable member and effective in positions other than the release position of said slidable member for operating said specimen admitting means.

6. The combination of a hardness detecting transformer including an air core coil constructed to contain a test specimen within its core, a slidable member biased to a blocking position to hold the specimen within the core and operable to a release position for passing a specimen from said transformer, means operable to admit specimens to said transformer one at a time, and means arranged to control said admitting means responsive to said slidable member, said second mentioned means operable to admit a specimen to the core when said slidable member moves to its blocking position.

7. The combination of means for testing specimens and to produce a predetermined control effect including a hardness detecting and balancing transformer interconnected, said detecting transformer having an air core to receive specimens, said predetermined control effect occurring only when said detecting transformer has as its core a specimen of substandard hardness, a slidable member biased to a blocking position to contain a specimen within said core while it is being tested and operable to a release position for passing said specimen from said core, a specimen reject channel, a specimen acceptance channel, a movable guide member below said slidable member normally positioned for directing a test specimen of standard hardness from said core into said acceptance channel and operable to a position for directing a test specimen of substandard hardness from said core into said reject channel when the slidable member is in its release position, and means for actuating and moving said movable guide member in response to said control effect from the position whereby a test specimen of standard hardness is directed into said acceptance channel, to the position whereby a specimen of substandard hardness is directed into said reject channel.

8. The combination of hardness detecting and balancing transformers having their primary windings in a circuit in a series magnetically adding relation and their secondary windings in a circuit in a series magnetically opposed relation, the secondary winding of the detecting transformer having an air core for the placement of specimens to be tested, a specimen reject solenoid controlled by a predetermined magnetic flux condition of said series opposed secondary windings, means including an electrical circuit for controlling the feed of specimens to said detecting transformer, means including a timer operable periodically to interrupt the circuit of said feed controlling means to prevent the feeding of specimens to said detecting transformer and to interrupt the circuit of said primary windings, means operable in response to said predetermined magnetic flux in said series opposed secondary windings when the current is stopped in the timer-controlled primary windings to energize said reject solenoid and to operate said timer to restore the circuits previously interrupted.

References Cited in the file of this patent

UNITED STATES PATENTS

| 1,335,985 | Pozzo et al. | Apr. 6, 1926 |
| 1,663,539 | Bellinger | Mar. 27, 1928 |
| 1,686,679 | Burrows | Oct. 9, 1928 |
| 1,686,815 | Imes | Oct. 9, 1928 |
| 1,813,746 | Kinsley | July 7, 1931 |
| 2,102,450 | Zuschlag | Dec. 14, 1937 |
| 2,234,456 | Schaurte et al. | Mar. 11, 1941 |
| 2,357,512 | Gaiser | Sept. 5, 1944 |
| 2,421,036 | Meister | Mar. 27, 1947 |
| 2,442,393 | Andrews | June 1, 1948 |
| 2,444,751 | Scott | July 6, 1948 |
| 2,563,213 | Coleman | Aug. 7, 1951 |
| 2,566,767 | Hunt | Sept. 4, 1951 |
| 2,645,341 | Diamond | July 14, 1953 |
| 2,668,618 | Seelhoff | Feb. 9, 1954 |

FOREIGN PATENTS

| 284,307 | Great Britain | Jan. 29, 1929 |
| 581,964 | Great Britain | Oct. 31, 1946 |